(12) United States Patent
Min

(10) Patent No.: US 10,043,328 B2
(45) Date of Patent: Aug. 7, 2018

(54) ELECTRONIC DOOR LOCK MANAGEMENT METHOD AND SYSTEM

(71) Applicant: Yu Min, Guangdong (CN)

(72) Inventor: Yu Min, Guangdong (CN)

(73) Assignee: Yu Min, Guangdong (CN)

( * ) Notice: Subject to any disclaimer, the term of this patent is extended or adjusted under 35 U.S.C. 154(b) by 0 days.

(21) Appl. No.: 15/317,447

(22) PCT Filed: Nov. 19, 2015

(86) PCT No.: PCT/CN2015/095038
§ 371 (c)(1),
(2) Date: Dec. 9, 2016

(87) PCT Pub. No.: WO2017/084070
PCT Pub. Date: May 26, 2017

(65) Prior Publication Data
US 2017/0287245 A1    Oct. 5, 2017

(51) Int. Cl.
*G07C 9/00* (2006.01)
*G06K 7/10* (2006.01)
*E05B 47/00* (2006.01)

(52) U.S. Cl.
CPC ...... *G07C 9/00111* (2013.01); *G06K 7/10297* (2013.01); *E05B 47/00* (2013.01)

(58) Field of Classification Search
CPC .................. G07C 9/00111; G06K 7/10297
USPC ........................................................ 340/5.61
See application file for complete search history.

(56) References Cited

U.S. PATENT DOCUMENTS

| 7,389,530 B2 * | 6/2008 | Raghunath | G07C 9/00309 713/155 |
| 8,947,200 B2 * | 2/2015 | Kuenzi | G07C 9/00103 340/5.51 |
| 2002/0180582 A1 * | 12/2002 | Nielsen | G07C 9/00103 340/5.6 |

FOREIGN PATENT DOCUMENTS

| CN | 2330748 | 7/1999 |
| CN | 1289883 | 4/2001 |
| CN | 2459406 | 11/2001 |
| CN | 1461995 | 12/2003 |
| CN | 203626429 | 6/2014 |

(Continued)

OTHER PUBLICATIONS

International Application No. PCT/CN2015/095038 International Search Report dated Jan. 26, 2016.

*Primary Examiner* — Vernal Brown
(74) *Attorney, Agent, or Firm* — Woodard, Emhardt, Moriarty, McNett & Henry, LLP

(57) ABSTRACT

An electronic door lock management method and system are provided. The method includes: setting electronic keys, including: acquiring lock ID card information having a first user ID through an induction zone, and binding the first user ID to a door lock; acquiring join-in card information having a second user ID through the induction zone, and confirming that the first user ID is the same as the second user ID; acquiring access card information through the induction zone and acquiring file card information through the induction zone, wherein the access card information comprises an access card ID, and the file card information comprises a file card ID; and setting a binding relationship between the access card ID and the file card ID, and taking the access card ID and the file card ID as the electronic keys.

13 Claims, 5 Drawing Sheets

(56) References Cited

FOREIGN PATENT DOCUMENTS

JP 2004-84306 3/2004

\* cited by examiner

ELECTRONIC DOOR LOCK MANAGEMENT METHOD AND SYSTEM

TECHNICAL FIELD

The present disclosure relates to the technical field of electronic door locks, and in particular relates to an electronic door lock management method and system.

BACKGROUND

In recent years, with gradual maturity of electronic door lock technologies, the application fields thereof are more and more widespread, and electronic door locks are widely applied to more and more restaurants, hotels, office buildings and the like. Ordinary electronic door locks need an external management platform and an access card reader to set electronic keys. However, the selling price and maintenance cost of the management platform are relatively high, thereby increasing use-cost of the electronic door lock. Therefore, with respect to small restaurants, hotels, offices and the like which do not require to set the electronic keys on a large scale, there is an urgent need for an electronic keys setting method which is easy to operate and has an advantage of low use-cost.

SUMMARY

The present disclosure proposes an electronic door lock management method and system. According to the method, electronic keys are directly set through an induction zone, and no external management platform and card reader are needed, thereby realizing simple operation, and effectively reducing operating cost.

In order to achieve such objective, the following technical solutions are adopted by the present disclosure.

In a first aspect, the present disclosure proposes an electronic door lock management method, including: setting electronic keys, the step of setting electronic keys specifically includes:
  acquiring lock ID card information having a first user ID through an induction zone, and binding the first user ID to a door lock;
  acquiring join-in card information having a second user ID through the induction zone, and confirming that the first user ID is the same as the second user ID;
  acquiring access card information through the induction zone and acquiring file card information through the induction zone, the access card information includes an access card ID, and the file card information includes a file card ID; and
  setting a binding relationship between the access card ID and the file card ID, and taking the access card ID and the file card ID as the electronic keys.

The step of setting electronic keys further includes: acquiring user information through a user setting zone;
  the step of acquiring user information through a user setting zone includes at least one of the followings: acquiring fingerprint information through a fingerprint window; acquiring password information through keys; acquiring remote control information through a signal receiver, and acquiring sound information through a sound receiver,
the user information includes at least one of the followings: the fingerprint information; the password information; the remote control information, and the sound information.

The step of setting a binding relationship between the access card ID and the file card ID and taking the access card ID and the file card ID as the electronic keys includes:
  setting a binding relationship among the access card ID, the file card ID and the user information, and taking the access card ID, the file card ID and the user information as the electronic keys.

The method further includes: deleting the electronic keys, and the step of deleting the electronic keys specifically includes:
  acquiring logout card information having a third user ID through the induction zone, and confirming that the third user ID is the same as the first user ID; and
  acquiring at least one of the access card ID of the access card information and the file card ID of the file card information through the induction zone, and deleting the access card ID and the file card ID which are served as the electronic keys.

The step of deleting the electronic keys further includes: acquiring the access card ID of the access card information and the file card ID of the file card information through the induction zone, and acquiring user information through the user setting zone, and deleting the access card ID, the file card ID and the user information which are served as the electronic keys.

The method further includes: deleting all the electronic keys, the step of deleting all the electronic keys specifically includes:
  acquiring the lock ID card information having the first user ID through the induction zone, and confirming that the first user ID is the same as the user ID bound to the door lock, and deleting all the electronic keys.

In the second aspect, the present disclosure proposes an electronic door lock management system, including: an electronic key setting module, configured to set electronic keys, and the electronic key setting module includes:
  a first acquisition module, configured to acquire lock ID card information having a first user ID through an induction zone, and bind the first user ID to a door lock;
  a first determination module, configured to acquire join-in card information having a second user ID through the induction zone, and confirm that the first user ID is the same as the second user ID;
  a second determination module, configured to acquire access card information through the induction zone and acquire file card information through the induction zone, the access card information includes an access card ID, and the file card information includes a file card ID; and
  a binding setting module, configured to set a binding relationship between the access card ID and the file card ID, and take the access card ID and the file card ID as the electronic keys.

The system further includes: a first electronic key deletion module, configured to delete the electronic keys, the first electronic key deletion module includes:
  a third determination module, configured to acquire logout card information through the induction zone, and confirm that a third user ID of the logout card information is the same as the first user ID; and
  a first deletion module, configured to acquire the access card ID of the access card information or the file card ID of the file card information through the induction zone, and delete the access card ID and the file card ID which are served as the electronic keys.

The system further includes: a second electronic key deletion module, configured to delete all the electronic keys, the second electronic key deletion module includes:
  a fourth determination module, configured to acquire the lock ID card information having the first user ID through the induction zone, and confirm that the first user ID is the user ID bound to the door lock; and
  a second deletion module, configured to delete all the electronic keys.

The system further includes:
  a lock ID card, configured to store the lock ID card information having the first user ID;
  a join-in card, configured to store the join-in card information having the second user ID;
  a logout card, configured to store the logout card information having the third user ID;
  an access card, configured to store the access card information, the access card information includes an access card ID;
  a file card, configured to store the file card information, the file card information includes a file card ID;
  the lock ID card, the join-in card, the logout card, the access card and the file card are all radio frequency identification cards.

The present disclosure provides an electronic door lock management method and system. According to the present disclosure, information of various functional access cards is acquired through the induction zone so as to set the electronic keys; and only direct operation on the electronic door lock is needed, and no external management platform and card reader are needed, thereby realizing simple operation, and effectively reducing operating cost.

DETAILED DESCRIPTION

The technical solution of the present disclosure is further described below by virtue of specific embodiments by combining with the drawings.

Embodiment I

Figure 1:
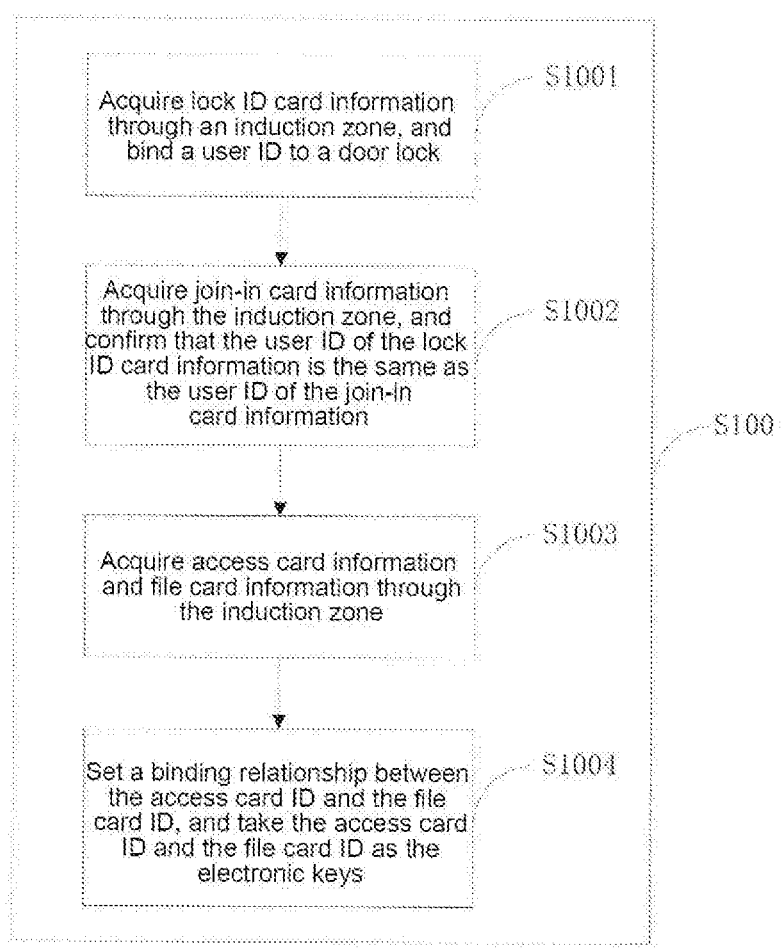
FIG. 1 is a method flow diagram showing embodiment I of an electronic door lock management method provided by the present disclosure.

Referring to FIG. 1, an electronic door lock management method includes steps described below.

In S100, electronic keys are set. The step of setting electronic keys includes the following steps.

In S1001, lock ID (identification) card information having a user ID is acquired through an induction zone, and the user ID is bound to a door lock.

The induction zone is provided on an electronic door lock, and the lock ID card information is stored in a lock ID card. In the present embodiment, the lock ID card is a radio frequency identification (RFID) card. The user ID is bound to the door lock, that is, the user ID is written into door card information, an electronic door lock in which the user ID is written is bound to the lock ID card, and then the electronic door lock and the lock ID card have the same user ID.

A prompt information may be presented by the electronic door lock after the lock ID card information is acquired by the induction zone. The prompt information set in the present embodiment is that: a green light of the electronic door lock is on and three beeps are sounded. The electronic door lock is successfully bound when the green light is off.

If no lock ID card information is acquired before any access card ID or file card ID is acquired through the induction zone, the electronic door lock is unlocked, indicating that the user ID of the lock ID card information is not bound to the door lock. After the lock ID card information is acquired through the induction zone and the user ID is bound to the door lock, the electronic door lock can be unlocked only when the access card ID and file card ID which are set as the electronic keys are acquired through the induction zone.

In S1002, join-in card information having user ID is acquired through the induction zone, and it is confirmed that the user ID of the lock ID card information is the same as the user ID of the join-in card information.

The join-in card information is stored in a join-in card. In the present embodiment, the join-in card is preferably a RFID (Radio Frequency Identification Devices) card.

After the user ID of the join-in card information is acquired through the induction zone, it is determined whether the user ID of the join-in card information is the same as that of the lock ID card information. If the user ID of the join-in card information is the same as the user ID of the lock ID card information, step S1003 can be proceeded, and a prompt information can be presented at this moment. In the present embodiment, the prompt information at the moment is set as that: the green light of the electronic door lock is on, one beep is sounded and then the green light flickers, indicating that the step S1003 can be proceeded. If the user ID of the join-in card information is different from the user ID of the lock ID card information, the process of setting is exited.

In S1003, access card information is acquired through the induction zone and file card information is acquired through the induction zone. The access card information includes an access card ID, and the file card information includes a file card ID.

The access card information is stored in the access card, the file card information is stored in the file card. In the present embodiment, the access card and the file card are preferably RFID cards.

The file card information needs to be acquired through the induction zone in a preset time after the access card information is acquired through the induction zone, otherwise the process of setting is exited, and the setting on the access card fails. In the present embodiment, the preset time is set as 5 seconds and also can be set as 3 seconds or 10 seconds. Duration of the preset time is not limited in the present disclosure.

In order to conveniently prompt a user to place the file card, a prompt information can be presented after the access card information is acquired through the induction zone. In the present embodiment, the prompt information at the moment is that: the green light of the electronic door lock is on, one beep is sounded and then the green light flickers. A prompt information is presented again if the file card information is acquired in the preset time after the access card information is acquired through the induction zone. The prompt information at the moment is that: the green light of the electronic door lock flickers, two beeps are sounded and the green light is off, and step S1004 is proceeded.

In S1004, a binding relationship between the access card ID and the file card ID is set, and the access card ID and the file card ID are served as the electronic keys.

A binding relationship between the access card ID and the file card ID is set, that is, the access card and the file card have a binding relationship. The access card ID and the file card ID are served as the electronic keys, thus the access card and the file card have the same function. At least one access card and at least one file card are needed, one access card and one file card are a pair of electronic keys. The number of the access cards and file cards can be increased according to actual needs in practical application, while the increased number of the access cards and the file cards should be the same.

According to the method, the lock ID card information, the join-in card information, the access card information and the file card information are preset, thus a variety of information is directly acquired through the induction zone upon setting the electronic door lock to set the electronic keys. Therefore, no external management platform and card reader are needed, thereby realizing simple operation, and effectively reducing operating cost.

Embodiment II

Figure 2:
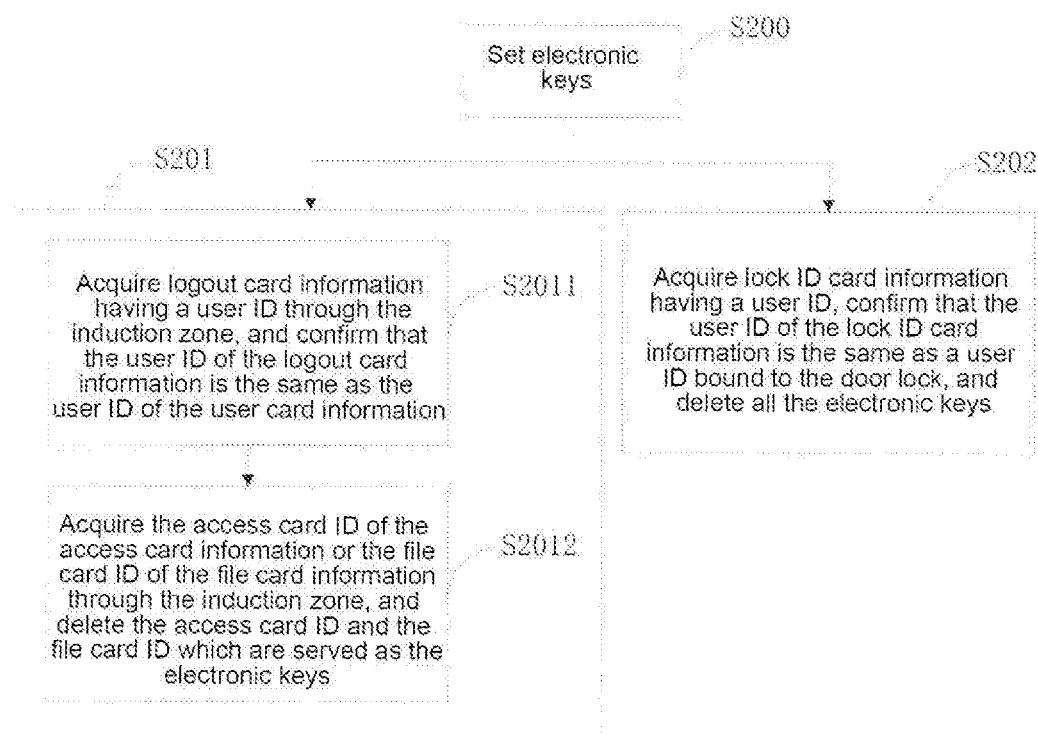
FIG. 2 is a method flow diagram showing embodiment II of an electronic door lock management method provided by the present disclosure.

Referring to FIG. 2, the present embodiment provides another electronic door lock management method, including steps described below.

In S200, electronic keys are set. This step is the same as the step S100, and unnecessary details are avoided herein.

In S201, the electronic keys are deleted. The electronic keys can also be deleted after being set.

The step of deleting the electronic keys includes the following steps.

In S2011, logout card information having a user ID is acquired though the induction zone, and the user ID of the logout card information is confirmed to be the same as the user ID of the lock ID card information.

The logout card information is stored in a logout card. In the present embodiment, the logout card is preferably an RFID card.

After the user ID of the logout card information is acquired through the induction zone, it is determined whether the user ID of the logout card information is the same as the user ID of the lock ID card information. If the user ID of the logout card information is the same as the user ID of the lock ID card information, step S2012 can be proceeded, and a prompt information can be presented at the moment. In the present embodiment, the prompt information at the moment is set as follows: the green light of the electronic door lock is on, one beep is sounded and then the green light flickers, indicating that the step S2012 can be proceeded.

In S2012, the access card ID of the access card information or the file card ID of the file card information is acquired through the induction zone, and the access card ID and the file card ID which are served as the electronic keys are deleted.

Deleting the electronic keys merely needs to acquire the access card ID of the access card information or the file card ID of the file card information through the induction zone, meanwhile delete the access card ID and the file card ID which are served as the electronic keys.

In the case that a certain access card is lost, the safety performance of the electronic door lock can be improved by deleting the electronic keys, and the deleted access card and file card cannot be used to unlock the electronic door lock. According to the method of deleting the electronic keys, only such pair of access card and file card is deleted, while other access cards and file cards are not influenced. Therefore, the user does not need to set the electronic keys for other access cards and file cards during use, thus the use is convenient.

In S202, lock ID card information having a user ID is acquired through the induction zone, and it is confirmed that the user ID of the lock ID card information is the same as the user ID bound to the door lock, and all the electronic keys are deleted.

The lock ID card information is acquired again through the induction zone. The lock ID card information, the join-in card information and all the electronic keys are deleted if the lock ID card information includes the user ID, meanwhile the binding between the user ID and the door lock is canceled. The electronic keys need to be reset for reuse.

The step S201 and step S202 are alternatively executed.

On the basis of presetting the lock ID card information, the join-in card information, the access card information and the file card information, acquiring a variety of information directly through the induction zone upon setting the electronic door lock to set the electronic keys without an external management platform and a card reader, the operation of which is simple and the operating cost is effectively reduced, in the present method, a method of deleting the electronic keys is added, so that the safety performance of the electronic door lock is improved. Different methods of deleting the electronic keys can be selected according to actual needs upon deleting the electronic keys, and the practicality of the present disclosure is improved.

Embodiment III

Figure 3:
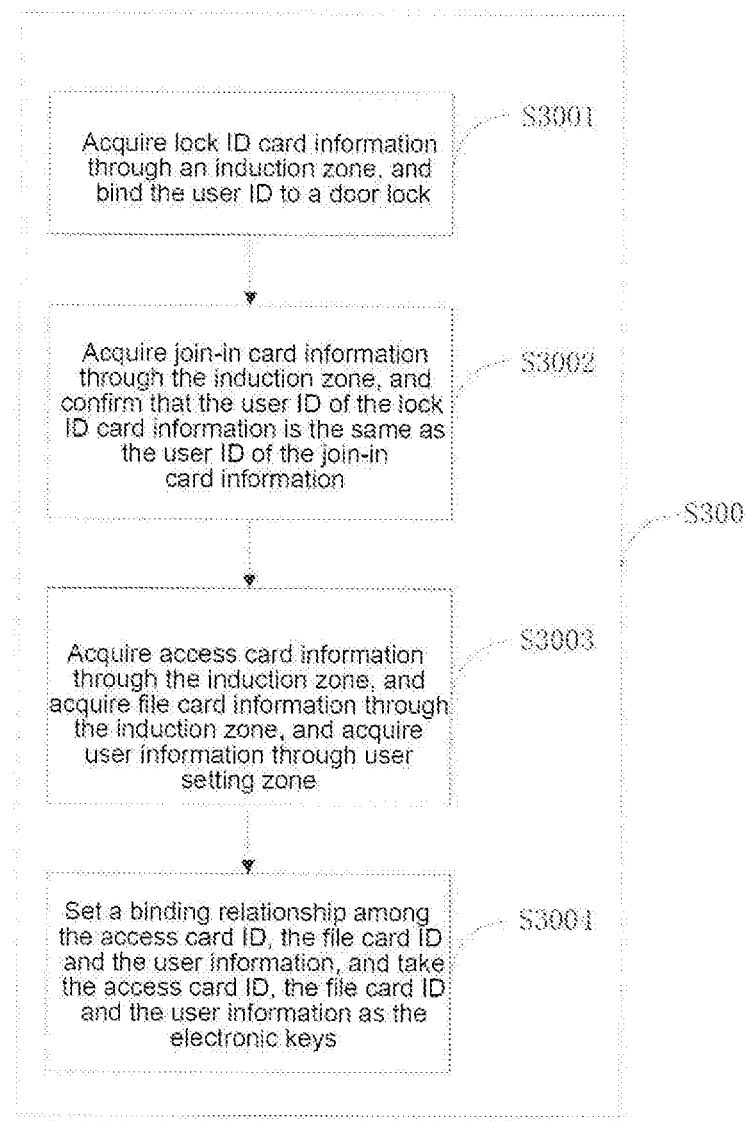
FIG. 3 is a method flow diagram showing embodiment III of an electronic door lock management method provided by the present disclosure.

Referring to FIG. 3, the present embodiment provides another electronic door lock management method, which includes steps described below.

In S300, electronic keys are set. The step of setting electronic keys includes the following steps.

In S3001, lock ID card information having a user ID is acquired through an induction zone, and the user ID is bound to a door lock. This step is the same as the step S1001, and unnecessary details are avoided herein.

In S3002, join-in card information having a user ID is acquired through the induction zone, and it is confirmed that the user ID of the lock ID card information is the same as the user ID of the join-in card information. This step is the same as the step S1002, and unnecessary details are avoided herein.

In S3003, access card information is acquired through the induction zone and file card information is acquired through the induction zone, further including:
  acquiring user information through a user setting zone, including: acquiring fingerprint information through a fingerprint window, and/or acquiring password information through keys, and/or acquiring remote control information through a signal receiver, and/or acquiring sound information through a sound receiver;
  the user information is the fingerprint information, and/or the password information, and/or the remote control information, and/or the sound information.

The access card information is stored in the access card, the file card information is stored in the file card. In the present embodiment, the access card and the file card are preferably RFID cards. Because the existing electronic door lock is provided with a fingerprint window in addition to the induction zone, a setting of taking the user information as the electronic key is added in the present embodiment. The user information is the fingerprint information, and/or the password information, and/or the remote control information and/or the sound information. The access card information is acquired through the induction zone and the file card information is acquired through the induction zone, and the user information can be further acquired through the user setting zone, and the user setting zone can include the fingerprint window, and/or keys, and/or the signal receiver and/or the sound receiver. A technical manner of acquiring the fingerprint information through the fingerprint window is not limited in the present embodiment, and an infrared fingerprint identification technology is preferably used. A sequence of acquiring the access card information through the induction zone, acquiring the file card information through the induction zone and acquiring the user information through the user setting zone is not limited in the present embodiment, and the time interval between two successive operations needs to be within a preset time, otherwise the process of setting is exited, and the setting on the electronic keys fails. In the present embodiment, the preset time is set as 5 seconds and can also be set as 3 seconds or 10 seconds. Duration of the preset time is not limited in the present disclosure. In order to conveniently prompt the user to operate, certain prompt information can be presented between two operations.

In S3004, the access card ID, a binding relationship among the access card ID, the file card ID and the user information is set, and the access card ID, the file card ID and the user information are served as the electronic keys.

A binding relationship among the access card ID, the file card ID and the user information is set, the access card ID, the file card ID and the user information are served as the electronic keys. Therefore, the access card and the file card have the same function. At least one access card and at least one file card are needed. The number of the access cards and the file cards can be increased according to actual needs in practical application, while the increased number of the access cards and the file cards must be the same.

According to the method, the lock ID card information, the join-in card information, the access card information and the file card information are preset, thus a variety of information is directly acquired through the induction zone upon setting the electronic door lock to set the electronic keys. Therefore, no external management platform and card reader are needed, thereby realizing simple operation, and effectively reducing operating cost. In addition, the fingerprint information or password information is added according to the existing electronic door lock technology, thereby improving the practicality of the method.

Embodiment IV

Figure 4:
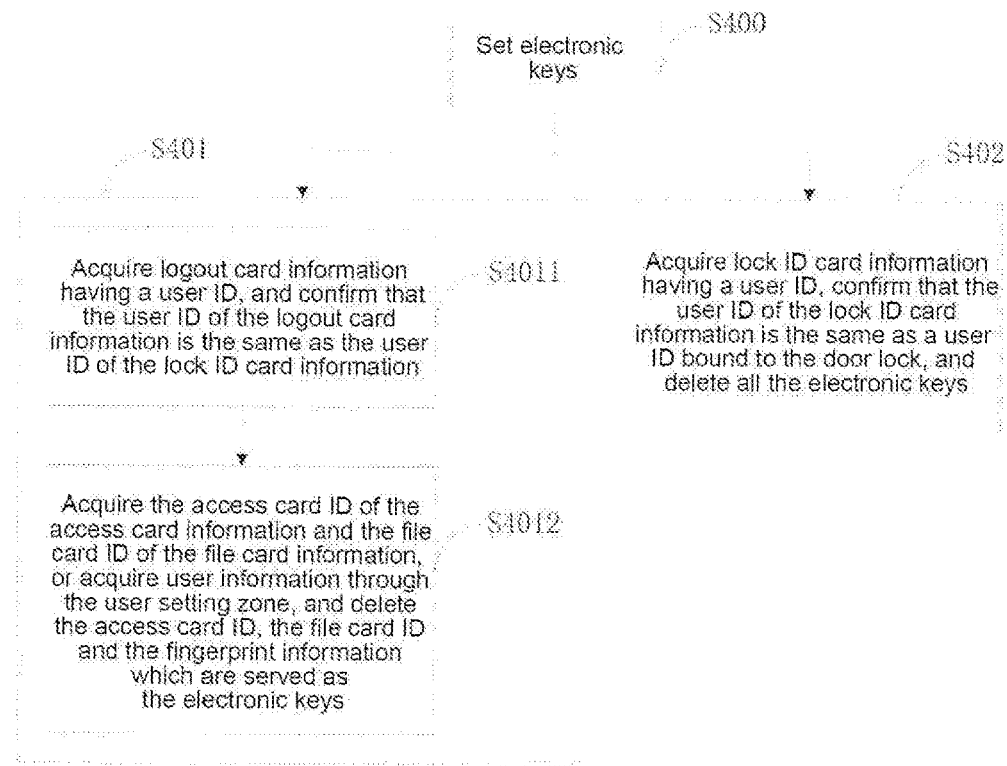
FIG. 4 is a method flow diagram showing embodiment IV of an electronic door lock management method provided by the present disclosure.

Referring to FIG. 4, the present embodiment provides another electronic door lock management method, including steps described below.

In S400, electronic keys are set. This step is the same as the step S300, and unnecessary details are avoided herein.

In S401, the electronic keys are deleted. The electronic keys can also be deleted after being set.

A step of deleting the electronic keys includes steps described below.

In S4011, logout card information having a user ID is acquired through the induction zone, and it is confirmed that the user ID of the logout card information is the same as the user ID of the lock ID card information. This step is the same as the step S2011, and unnecessary details are avoided herein.

In S4012, the access card ID of the access card information and the file card ID of the file card information are acquired through the induction zone, and user information is acquired through the user setting zone; and the access card ID, the file card ID and the user information which are served as the electronic keys are deleted.

Deleting the electronic keys merely needs to acquire the access card ID of the access card information or the file card ID of the file card information through the induction zone, acquire the bound user information through the user setting zone, meanwhile the access card ID, the file card ID and the bound user information which are served as the electronic keys are deleted.

The safety performance of the electronic door lock can be improved through deleting the electronic keys, and none of the deleted access card, file card and the bound user information can be used to unlock the electronic door lock any more. If both the access card and file card are lost, the bound user information can be acquired through the user setting zone, and the access card ID, the file card ID and the bound user information which are served as the electronic keys are deleted. Such method of deleting the electronic keys merely deletes the access card and file card set as being in the binding relationship, without influencing other access cards and file cards. Therefore, the user does not need to set electronic keys for other access cards and file cards during use, and the use is convenient.

In S402, lock ID card information having a user ID is acquired through the induction zone, and it is confirmed that the user ID of the lock ID card information is the same as a user ID bound by the door lock, and all the electronic keys are deleted.

This step is the same as the step S202, and unnecessary details are avoided herein.

The step S401 and step S402 are alternatively executed.

According to the present disclosure, the electronic keys are directly set through the induction zone, and no external management platform and card reader are needed, thereby realizing simple operation, and effectively reducing operating cost.

Embodiment V

The present embodiment provides an electronic door lock management system.

Figure 5:
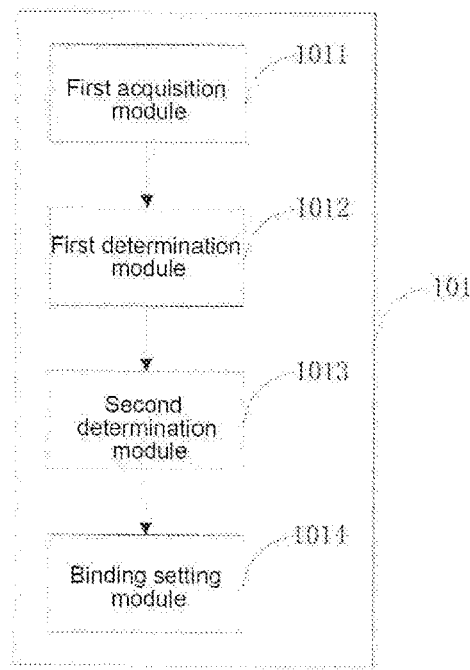
FIG. 5 is a function module diagram showing an electronic door lock management system provided by the present disclosure.

Referring to FIG. 5, the electronic door lock management system includes an electronic key setting module 101.

The electronic key setting module 101 includes:

a first acquisition module 1011, configured to acquire lock ID card information having a user ID through an induction zone, and the user ID is bound to a door lock;

a first determination module 1012, configured to acquire join-in card information having a user ID through the induction zone, and confirm that the user ID of the lock ID card information is the same as the user ID of the join-in card information;

a second determination module 1013, configured to acquire access card information through the induction zone and acquire file card information through the induction zone, the access card information includes an access card ID, and the file card information includes a file card ID; and a binding setting module 1014, configured to set a binding relationship between the access card ID and the file card ID, and take the access card ID and the file card ID as the electronic keys.

According to the present disclosure, the lock ID card information, the join-in card information, the logout card information, the access card information and the file card information are stored through various access cards, and a variety of access card information is acquired through the induction zone. Therefore, the electronic keys can be directly set on the electronic door lock, and no external management platform and card reader are needed, thereby realizing simple operation, and effectively reducing operating cost.

Embodiment VI

Figure 6:
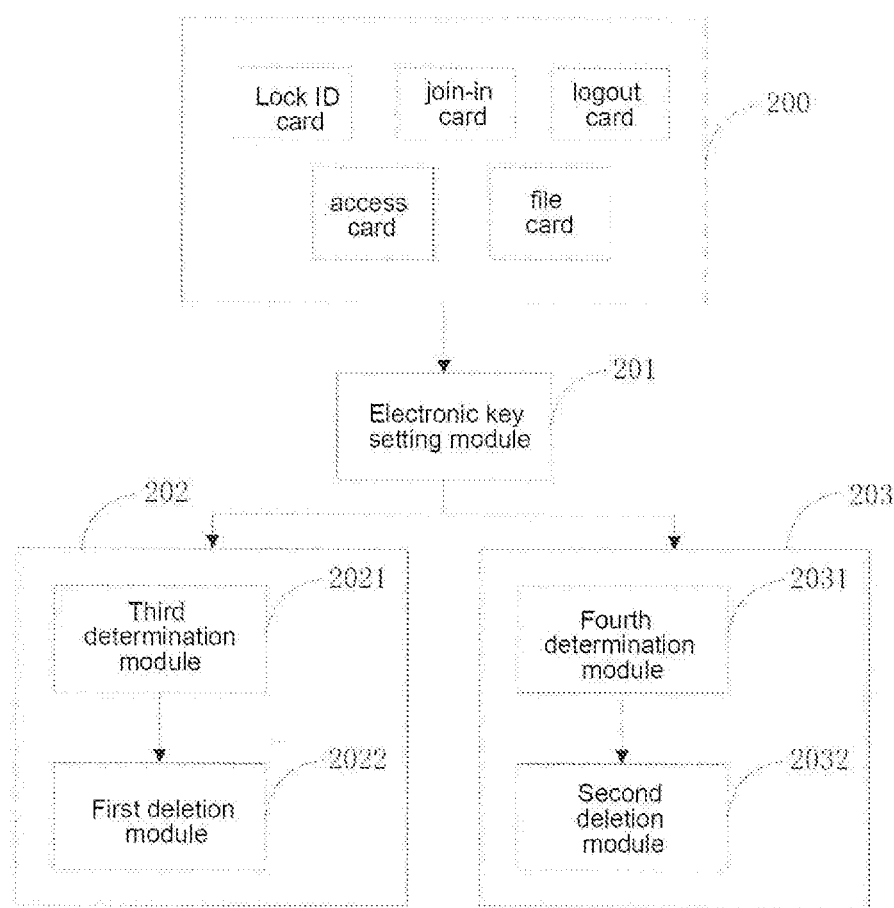
FIG. 6 is a function module diagram showing another electronic door lock management system provided by the present disclosure.

Referring to FIG. 6, the present embodiment provides another electronic door lock management system, including: door cards 200, an electronic key setting module 201, a first electronic key deletion module 202 and a second electronic key deletion module 203.

The door cards 200 include:
a lock ID card, configured to store lock ID card information having a user ID; an join-in card, configured to store join-in card information having a user ID; a logout card, configured to store logout card information having a user ID; an access card, configured to store access card information having an access card ID; and a file card, configured to store file card information having a file card ID; the number of first door card and second door card is not limited in the present disclosure, and there are at least one first door card and at least one second door card and the first door card and second door card are used in pair.

All of the lock ID card, the join-in card, the logout card, the access card and the file card are radio frequency identification (RFID) cards.

The electronic key setting module 201 herein is the same as the electronic key setting module 101, and unnecessary details are avoided herein.

The first electronic key deletion module 202 is configured to delete electronic keys, and the first electronic key deletion module includes:
a third determination module 2021, configured to acquire logout card information through the induction zone, and confirm that a user ID of the logout card information is the same as the user ID of the lock ID card information;
a first deletion module 2022, configured to acquire the access card ID of the access card information or the file card ID of the file card information through the induction zone, and delete the access card ID and the file card ID which are served as the electronic keys.

The second electronic key deletion module 203 is configured to delete all the electronic keys. The second electronic key deletion module includes:
a fourth determination module 2031, configured to acquire the lock ID card information having a user ID through the induction zone, and confirm that the user ID of the lock ID card information is the same as a user ID bound to the door lock;
a second deletion module 2032, configured to delete all the electronic keys.

According to the present disclosure, the lock ID card information, the join-in card information, the logout card information, the access card information and the file card information are stored through various door cards, and a variety of door card information is acquired through the induction zone. Therefore, the electronic keys can be directly set on the electronic door lock, and no external management platform and card reader are needed, thereby realizing simple operation, and effectively reducing operating cost. To delete the electronic keys, it is merely needed to acquire the logout card information, the access card information and the file card information through the induction zone or acquire the lock ID card information through the induction zone, thereby the electronic keys can be deleted directly on the electronic door lock. The operation is simple, and the safety performance is high.

The technical principles of the embodiments of the present disclosure are described above by combining specific embodiments, and these descriptions are merely used for illustrating the principles of the embodiments of the present disclosure but cannot be illustrated as a limitation to the protection scope of the embodiments of the present disclosure in any manner. Those skilled in the art can contemplate other specific implementation modes of the embodiments of the present disclosure without contributing any creative work, and these modes fall in the protection scope of the embodiments of the present disclosure.

What is claimed is:

1. An electronic door lock management method, comprising: setting electronic keys, wherein the step of setting electronic keys comprises:
acquiring lock ID card information having a first user identification (ID) through an induction zone, and binding the first user ID to a door lock;
acquiring join-in card information having a second user ID through the induction zone, and confirming that the first user ID is the same as the second user ID;
acquiring access card information through the induction zone and acquiring file card information through the induction zone, wherein the access card information comprises an access card ID, and the file card information comprises a file card ID; and
setting a binding relationship between the access card ID and the file card ID, and taking the access card ID and the file card ID as the electronic keys.

2. The electronic door lock management method according to claim 1, wherein the step of setting electronic keys further comprises acquiring user information through a user setting zone,
the step of acquiring user information through a user setting zone comprising at least one of followings: acquiring fingerprint information through a fingerprint window, acquiring password information through keys, acquiring remote control information through a signal receiver, and acquiring sound information through a sound receiver,
wherein the user information comprises at least one of: the fingerprint information, the password information, the remote control information, and the sound information.

3. The electronic door lock management method according to claim 2, wherein the step of setting a binding relationship between the access card ID and the file card ID and taking the access card ID and the file card ID as the electronic keys comprises:
setting a binding relationship among the access card ID, the file card ID and the user information, and taking the access card ID, the file card ID and the user information as the electronic keys.

4. The electronic door lock management method according to claim 3, further comprising deleting the electronic keys, wherein the step of deleting the electronic keys comprises:
acquiring the access card ID of the access card information and the file card ID of the file card information through the induction zone, and acquiring user information through the user setting zone, and deleting the access card ID, the file card ID and the user information which served as the electronic keys.

5. The electronic door lock management method according to claim 3, further comprising deleting all the electronic keys, wherein the step of deleting all the electronic keys comprises:
acquiring the lock ID card information having a first user ID through the induction zone, and confirming that the first user ID is the same as the user ID bound to the door lock, and deleting all the electronic keys.

6. The electronic door lock management method according to claim 2, further comprising deleting all the electronic keys, wherein the step of deleting all the electronic keys comprises:
acquiring the lock ID card information having a first user ID through the induction zone, and confirming that the first user ID is the same as the user ID bound to the door lock, and deleting all the electronic keys.

7. The electronic door lock management method according to claim 2, further comprising deleting the electronic keys, wherein the step of deleting the electronic keys comprises:
acquiring the access card ID of the access card information and the file card ID of the file card information through the induction zone, and
acquiring user information through the user setting zone, and
deleting the access card ID, the file card ID and the user information which served as the electronic keys.

8. The electronic door lock management method according to claim 1, further comprising deleting the electronic keys, wherein the step of deleting the electronic keys comprises:
acquiring logout card information having a third user ID through the induction zone, and confirming that the third user ID is the same as the first user ID; and
acquiring at least one of the access card ID of the access card information and the file card ID of the file card information through the induction zone, and deleting the access card ID and the file card ID which served as the electronic keys.

9. The electronic door lock management method according to claim 1, further comprising: deleting all the electronic keys, wherein the step of deleting all the electronic keys comprises:
acquiring the lock ID card information having the first user ID through the induction zone, and confirming that the first user ID is the same as the user ID bound to the door lock, and
deleting all the electronic keys.

10. An electronic door lock management system, comprising: an electronic key setting module, configured to set electronic keys, wherein the electronic key setting module comprises: a first acquisition module, configured to acquire lock ID card information having a first user ID through an induction zone, and bind the first user ID to a door lock;

a first determination module, configured to acquire join-in card information having a second user ID through the induction zone, and confirm that the first user ID is the same as the second user ID;
a second determination module, configured to acquire access card information through the induction zone and acquire file card information through the induction zone, wherein the access card information comprises an access card ID, and the file card information comprises a file card ID; and
a binding setting module, configured to set a binding relationship between the access card ID and the file card ID, and take the access card ID and the file card ID as the electronic keys.

11. The electronic door lock management system according to claim 10, further comprising: a first electronic key deletion module, configured to delete the electronic keys, wherein the first electronic key deletion module comprises:
a third determination module, configured to acquire logout card information through the induction zone, and confirm that a third user ID of the logout card information is the same as the first user ID; and
a first deletion module, configured to acquire the access card ID of the access card information or the file card ID of the file card information through the induction zone, and delete the access card ID and the file card ID which served as the electronic keys.

12. The electronic door lock management system according to claim 10, further comprising: a second electronic key deletion module, configured to delete all the electronic keys, wherein the second electronic key deletion module comprises:
a fourth determination module, configured to acquire the lock ID card information having the first user ID through the induction zone, and confirm that the first user ID is the user ID bound to the door lock; and
a second deletion module, configured to delete all the electronic keys.

13. The electronic door lock management system according to claim 10, further comprising:
a lock ID card, configured to store the lock ID card information having the first user ID;
a join-in card, configured to store the join-in card information having the second user ID;
a logout card, configured to store the logout card information having the third user ID;
an access card, configured to store the access card information, wherein the access card information comprises an access card ID;
a file card, configured to store the file card information, wherein the file card information comprises a file card ID;
wherein the lock ID card, the join-in card, the logout card, the access card and the file card are all radio frequency identification cards.

* * * * *